US012581331B2

(12) United States Patent
He et al.

(10) Patent No.: US 12,581,331 B2
(45) Date of Patent: Mar. 17, 2026

(54) CHANNEL TRANSMISSION METHOD, DEVICE AND STORAGE MEDIUM

(71) Applicant: GUANGDONG OPPO MOBILE TELECOMMUNICATIONS CORP., LTD., Guangdong (CN)

(72) Inventors: Chuanfeng He, Guangdong (CN); Weijie Xu, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 639 days.

(21) Appl. No.: 17/492,682

(22) Filed: Oct. 4, 2021

(65) Prior Publication Data

US 2022/0030451 A1 Jan. 27, 2022

Related U.S. Application Data

(63) Continuation of application No. PCT/CN2019/081613, filed on Apr. 4, 2019.

(51) Int. Cl.
| | |
|---|---|
| *H04W 24/08* | (2009.01) |
| *H04W 72/0446* | (2023.01) |
| *H04W 72/0453* | (2023.01) |
| *H04W 72/23* | (2023.01) |
| *H04W 76/28* | (2018.01) |

(52) U.S. Cl.
CPC ....... *H04W 24/08* (2013.01); *H04W 72/0446* (2013.01); *H04W 72/0453* (2013.01); *H04W 72/23* (2023.01); *H04W 76/28* (2018.02)

(58) Field of Classification Search
CPC .................................................... H04W 24/08
See application file for complete search history.

(56) References Cited

U.S. PATENT DOCUMENTS

| | | | |
|---|---|---|---|
| 2020/0120606 A1* | 4/2020 | Beale .................... | H04W 76/28 |
| 2022/0201516 A1* | 6/2022 | Guo ...................... | H04W 24/08 |

FOREIGN PATENT DOCUMENTS

| | | | | |
|---|---|---|---|---|
| CN | 108631992 | 10/2018 | | |
| CN | 109151955 | 1/2019 | | |
| CN | 109152020 | 1/2019 | | |
| CN | 109314952 | 2/2019 | | |
| WO | WO-2018171770 | * 9/2018 | .......... | H04L 5/0053 |
| WO | WO-2018171770 A1 | * 9/2018 | .......... | H04L 5/0053 |
| WO | 2018204344 | 11/2018 | | |

(Continued)

OTHER PUBLICATIONS

"International Search Report (Form PCT/ISA/210) of PCT/CN2019/081613", mailed on Jan. 9, 2020, with English translation thereof, pp. 1-5.

(Continued)

*Primary Examiner* — Abdeltif Ajid

(74) *Attorney, Agent, or Firm* — Hodgson Russ LLP

(57) ABSTRACT

Disclosed is a channel transmission method. The method comprises: if a terminal device detects a first channel on a time domain resource thereof, the terminal device monitors a second channel; if the terminal device detects no first channel on the time domain resource thereof, the terminal device does not monitor the second channel. Also disclosed are another channel transmission method, a device, and a storage medium.

20 Claims, 3 Drawing Sheets monitoring a second channel if a terminal device detects a first channel on a time frequency resource of the first channel; and not monitoring the second channel if the terminal device does not detect the first channel on the time frequency resource of the first channel

S201

(56)          References Cited

FOREIGN PATENT DOCUMENTS

| | | |
|---|---|---|
| WO | 2019027300 | 2/2019 |
| WO | 2019030079 | 2/2019 |

OTHER PUBLICATIONS

"Written Opinion of the International Searching Authority (Form PCT/ISA/237) of PCT/CN2019/081613", mailed on Jan. 9, 2020, with English translation thereof, pp. 1-7.
3GPP, "3rd Generation Partnership Project; Technical Specification Group Radio Access Network; NR; Physical layer procedures for control (Release 15)", 3GPP TS 38.213 V15.3.0, Sep. 2018, pp. 1-101.
Office Action of China Counterpart Application No. 202210850715.0 with English translation thereof, issued on Jul. 26, 2023, pp. 1-15.
"Search Report of Europe Counterpart Application", issued on Feb. 23, 2022, p. 1-p. 8.

\* cited by examiner

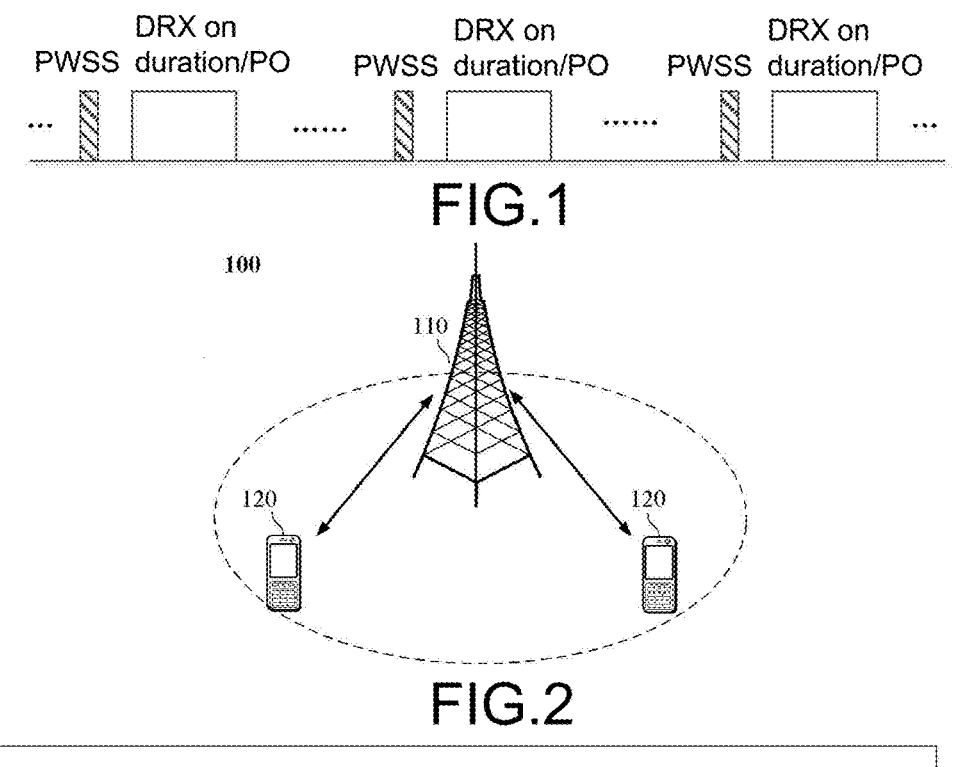

PWSS    DRX on duration/PO    PWSS    DRX on duration/PO    PWSS    DRX on duration/PO

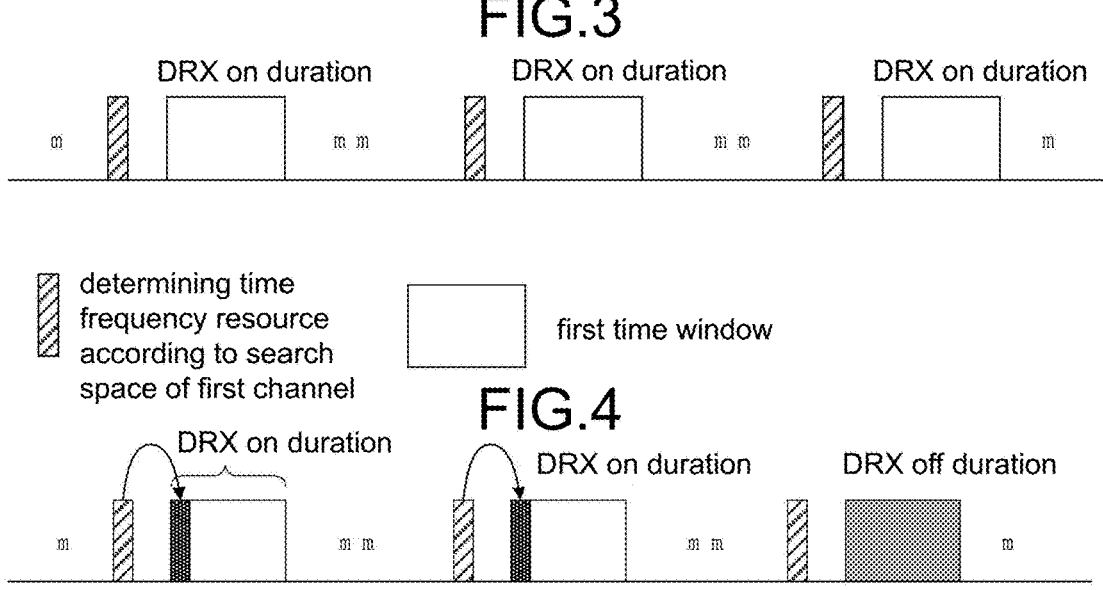

monitoring a second channel if a terminal device detects a first channel on a time frequency resource of the first channel; and not monitoring the second channel if the terminal device does not detect the first channel on the time frequency resource of the first channel

DRX on duration        DRX on duration        DRX on duration determining time frequency resource according to search space of first channel        first time window

FIG.4

DRX on duration        DRX on duration        DRX off duration

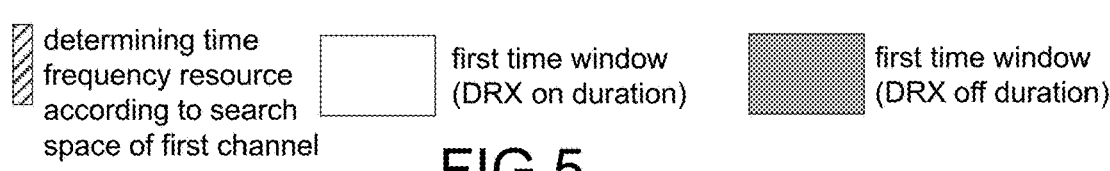

determining time frequency resource according to search space of first channel        first time window (DRX on duration)        first time window (DRX off duration)

FIG.5

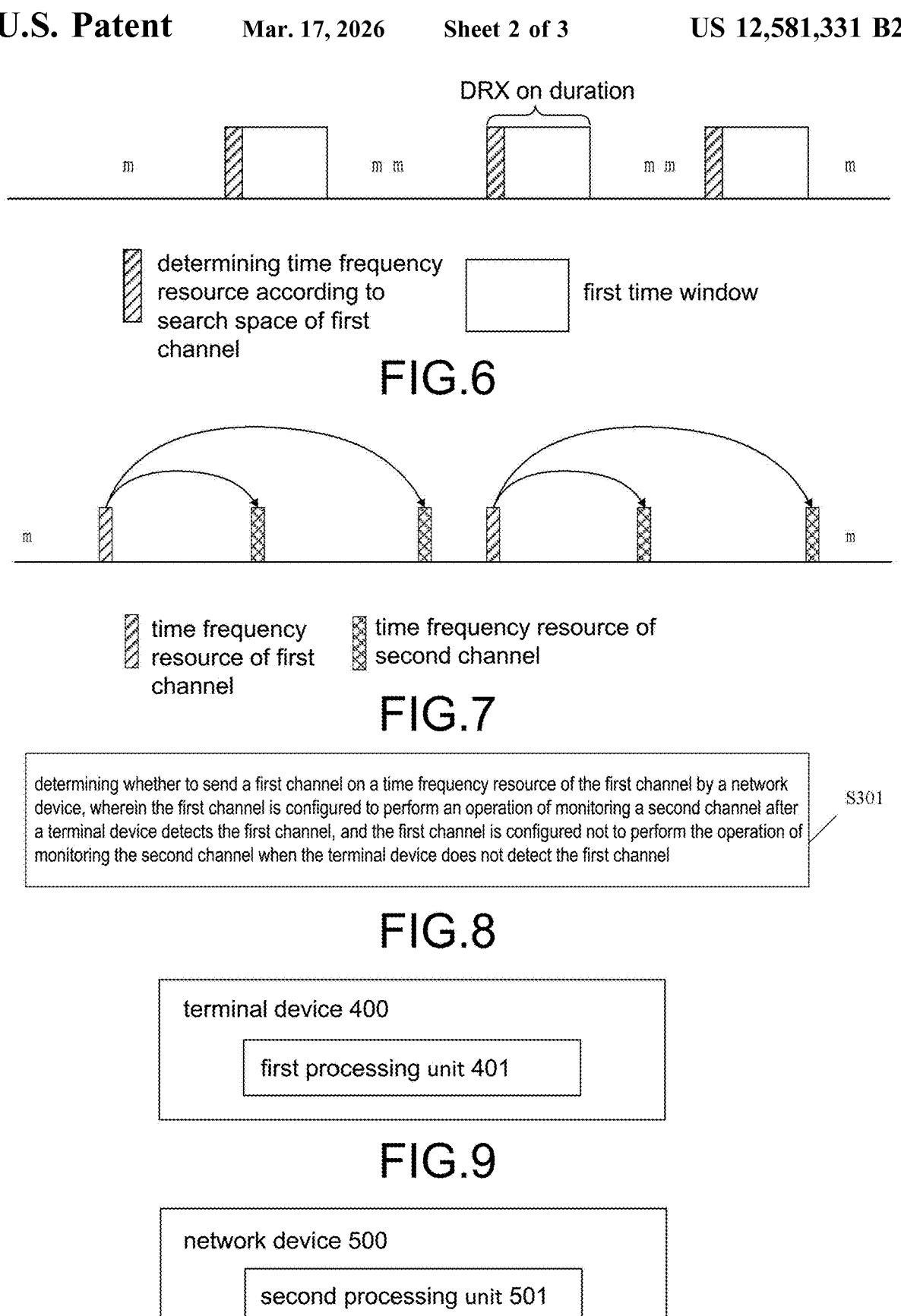

DRX on duration

☑ determining time frequency resource according to search space of first channel ☐ first time window

FIG.6

☑ time frequency resource of first channel

☒ time frequency resource of second channel

FIG.7 determining whether to send a first channel on a time frequency resource of the first channel by a network device, wherein the first channel is configured to perform an operation of monitoring a second channel after a terminal device detects the first channel, and the first channel is configured not to perform the operation of monitoring the second channel when the terminal device does not detect the first channel

S301

FIG.8 terminal device 400 first processing unit 401

FIG.9 network device 500 second processing unit 501

CHANNEL TRANSMISSION METHOD, DEVICE AND STORAGE MEDIUM

CROSS-REFERENCE TO RELATED APPLICATION

This application is a continuation of international PCT application serial no. PCT/CN2019/081613, filed on Apr. 4, 2019. The entirety of the above-mentioned patent application is hereby incorporated by reference herein and made a part of this specification.

BACKGROUND

Technical Field

The disclosure relates to a field of wireless communication technology, and in particular, relates to a channel transmission method, a device, and a storage medium.

Description of Related Art

In the new radio (NR) technology, through configuring a physical downlink control channel (PDCCH) search space for a terminal device, a network device may instruct the terminal device to monitor the PDCCH on the corresponding time frequency resource. In the related art, when the network device instructs the terminal device to monitor the PDCCH, the overheads of the system increase and the complexity of the system also rises.

SUMMARY

To solve the foregoing technical problems, the embodiments of the disclosure provide a channel transmission method, a device, and a storage medium capable of enabling a terminal device to determine whether to monitor a physical downlink control channel (PDCCH) with reduced system overheads and lowered system complexity.

In the first aspect, in an embodiment of the disclosure, a channel transmission method is provided, and the method includes the following steps. If a first channel is detected by the terminal device on a time frequency resource of the first channel, the terminal device monitors a second channel. If no first channel is detected by the terminal device on the time frequency resource of the first channel, the terminal device does not monitor the second channel.

In the second aspect, in an embodiment of the disclosure, a channel transmission method is provided, and the method includes the following steps. A network device determines whether to send a first channel on a time frequency resource of the first channel. When the first channel is detected by a terminal device, the terminal device monitors a second channel. When no first channel is detected by the terminal device, the terminal device does not monitor the second channel.

In the third aspect, an embodiment of the disclosure provides a terminal device. The terminal device includes a first processing unit configured to monitor a second channel if a first channel is detected on a time frequency resource of the first channel.

The second channel is not monitored if no first channel is detected by the terminal device on the time frequency resource of the first channel.

In the fourth aspect, an embodiment of the disclosure provides a network device. The network device includes a second processing unit configured to determine whether to send a first channel on a time frequency resource of the first channel.

When the first channel is detected by a terminal device, the terminal device monitors a second channel.

When no first channel is detected by the terminal device, the terminal device does not monitor the second channel.

In the fifth aspect, an embodiment of the disclosure provides a terminal device including a processor and a memory configured for storing a computer program that can run on the processor. The processor is configured to perform the steps of the channel transmission method executed by the terminal device when running the computer program.

In the sixth aspect, an embodiment of the disclosure provides a network device including a processor and a memory configured for storing a computer program that can run on the processor. The processor is configured to perform the steps of the channel transmission method executed by the network device when running the computer program.

In the seventh aspect, an embodiment of the disclosure provides a storage medium storing an executable program. When the executable program is executed by a processor, the channel transmission method executed by the terminal device is implemented.

In the eighth aspect, an embodiment of the disclosure provides a storage medium storing an executable program. When the executable program is executed by a processor, the channel transmission method executed by the network device is implemented.

In a channel transmission method provided by an embodiment of the disclosure, if a terminal device detects a first channel on a time frequency resource of the first channel, the terminal device monitors a second channel. If no first channel is detected by the terminal device on the time frequency resource of the first channel, the terminal device does not monitor the second channel. On the one hand, a new energy-saving channel or signal is not required to be introduced in the embodiments of the disclosure. Only by detecting the first channel on the time frequency resource of the first channel, the terminal device may determine whether to monitor the second channel in the first time window associated with the time frequency resource of the first channel. On the other hand, if the network device requires the terminal device to monitor the second channel in the first time window, the first channel is only required to be sent in advance on the time frequency resource of the first channel associated with the first time window, and additional information is not required to be introduced. Since the network device itself needs to schedule data transmission of the terminal device through the first channel, in the embodiments of the disclosure, the network device sends the first channel in advance merely. If the network device does not require the terminal device to monitor the second channel in the first time window, the first channel may not be sent on the time frequency resource of the first channel associated with the first time window, and additional information is not required to be introduced. The terminal device does not monitor the second channel in the first time window, and power consumption of the terminal device is thus lowered.

BRIEF DESCRIPTION OF THE DRAWINGS

FIG. 1 is a schematic diagram of triggering of a terminal device to monitor a physical downlink control channel (PDCCH) according to the disclosure.

FIG. 2 is a schematic diagram of a composition structure of a communication system according to an embodiment of the disclosure.

FIG. 3 is a schematic flow chart of optional processing of a channel transmission method according to an embodiment of the disclosure.

FIG. 4 is a first schematic diagram of an association relationship between a first time window and a time frequency resource of a first channel according to an embodiment of the disclosure.

FIG. 5 is a schematic diagram of a relationship between a resource indicated by DCI and the first time window according to an embodiment of the disclosure.

FIG. 6 is a second schematic diagram of the association relationship between the first time window and the time frequency resource of the first channel according to an embodiment of the disclosure.

FIG. 7 is a schematic diagram of an association relationship between the time frequency resource of the first channel and a time frequency resource of a second channel according to an embodiment of the disclosure.

FIG. 8 is another schematic flow chart of optional processing of the channel transmission method according to an embodiment of the disclosure.

FIG. 9 is a schematic diagram of a composition structure of a terminal device according to an embodiment of the disclosure.

FIG. 10 is a schematic diagram of a composition structure of a network device according to an embodiment of the disclosure.

DESCRIPTION OF THE EMBODIMENTS

Figure 11:
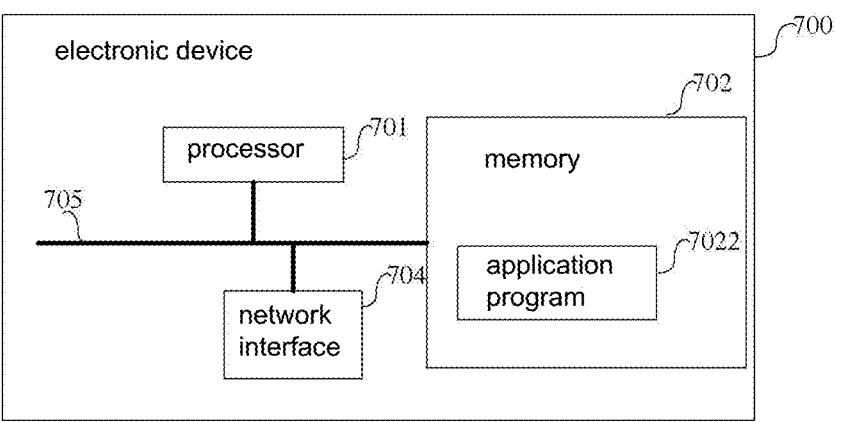
FIG. 11 is a schematic diagram of a hardware composition structure of an electronic device according to an embodiment of the disclosure.

To better understand the features and technical content of the embodiments of the disclosure in detail, the implementation of the embodiments of the disclosure will be described in detail below with reference to the accompanying drawings. The accompanying drawings are provided for reference and description only, and are not used to limit the embodiments of the disclosure.

Before the channel transmission method provided by the embodiments of the disclosure is described in detail, a brief description of channel transmission in the related art is provided first.

The application of 5G technology enables wireless broadband mobile communications to have a higher peak rate, larger transmission bandwidth, and lower transmission delay. For instance, the working bandwidth of 5G terminal equipment is on the order of 100 MHz to hundreds of MHz, the data transmission rate is Gbps, and the transmission delay is lowered to the ms level. But for terminal equipment, problems in implementation and specific use occur. For instance, broadband terminal equipment radio frequency and extremely fast baseband processing cause the power consumption of the terminal to increase compared to the previous wireless communication system, which may affect the standby time and use time of 5G terminal equipment and even affect the battery life of the terminal. In addition, a large amount of power consumption of the terminal equipment is wasted in the radio resource control (RRC) connection state. For instance, the terminal device is required to periodically monitor the physical downlink control channel (PDCCH) based on the configuration of the PDCCH search space in the connected state. However, in an actual device, scheduling for the terminal device is only initiated on a small number of PDCCH transmission slots, and the remaining large number of slots are not scheduled for the terminal device, nor are they sent on the PDCCH for the terminal device. In the 5G evolution technology, the requirement for power saving grows considerably. In order to achieve the goal of power saving, the power saving function of terminal devices needs to be considered in the following dimensions:

1) Time Domain

By reducing the time for UE to turn on a receiver, the power consumption of the terminal device is reduced. In an existing discontinuous reception (DRX) mechanism, during each DRX on duration, the terminal device needs to continuously monitor the PDCCH to determine whether a network device schedules data transmission to itself. However, for most terminal devices, reception of data transmission may not be needed for a long period of time, but it is still necessary to maintain a regular wake-up mechanism to monitor possible downlink transmissions. For this type of terminal devices, power saving may be further optimized. A power saving signal (PWSS) is introduced to indicate whether the terminal device needs to wake up during the DRX on duration before the DRX on duration starts to receive downlink channels and signals. In this way, the power consumption of the terminal device caused by unnecessary reception may be reduced.

As shown in FIG. 1, a schematic diagram of triggering of a terminal device to monitor a PDCCH is provided according to the disclosure, and if a network device determines that the terminal device is required to be scheduled in DRX on duration, an indication signal, such as a PWSS, is sent to the terminal device before the DRX on duration to wake up the terminal device. Otherwise, the indication signal is not sent to the terminal device. The terminal device only performs PDCCH monitoring and data reception in the DRX on duration after detecting the PWSS, otherwise, the terminal device does not perform the PDCCH monitoring. At this time, the terminal device only needs to detect the PWSS to determine whether to monitor the PDCCH during this DRX on duration, and power consumption of the terminal device may be saved in this way compared to direct monitoring of the PDCCH. Similarly, for a terminal device receiving a paging message under RRC idle, before a paging occasion (PO), the PWSS is detected to determine whether the PDCCH is required to be monitored in this PO.

2) Frequency Domain

By configuring a received bandwidth to be quickly matched with traffic of the terminal device, reduction in power consumption of the terminal device is achieved. For example, according to the traffic of the terminal device, a band width part (BWP) is quickly switched, or a carrier wave is activated and deactivated. In this way, a reception band width of the terminal device may be quickly reduced when the traffic is low, so as to achieve the goal of power consumption reduction.

3) Processing Time and Complexity

When the network device schedules the terminal device to receive downlink data, downlink control information (DCI) schedules a physical downlink shared channel (PDSCH) of this slot and PDSCH reception across the slot, and the processing time requirements for the terminal device are different. The different processing time requirements of the terminal device are also reflected in delay requirements for the terminal device to feed back hybrid automatic repeat request-acknowledgment (HARQ-ACK) and delay requirements for uplink scheduling. If the processing time requirements for the terminal device may be relaxed, the goal of power consumption reduction may be achieved. Other configurations that may affect the processing complexity of the terminal device and thus affect the power consumption include a multiple-input multiple-output (MIMO) configuration/layer, an antenna configuration, channel state information (CSI) feedback, radio resource management (RRM) measurement, etc.

4) PDCCH Reception

PDCCH monitoring is the main source of power consumption of the terminal device. Reducing the monitoring of the PDCCH is of great significance to the power saving of the terminal device. In the related art, PDCCH monitoring is triggered by defining the PWSS, the PDCCH monitoring is stopped by defining a go-to-sleep (GTS) signal, and a control resource set (CORESET)/search space of the terminal device is dynamically or semi-statically changed or switched through information.

However, when the terminal device is triggered to monitor the PDCCH through a special signal such as PWSS, the overheads and complexity of the system may increase. When a new signal is used to trigger the terminal device to monitor the PDCCH, the new signal may lead to a problem of system compatibility.

In view of the foregoing problems, the disclosure provides a channel transmission method. The channel transmission method provided by the embodiments of the disclosure may be applied to various communication systems, such as a global system of mobile communication (GSM), a code division multiple access (CDMA) system, a wideband code division multiple access (WCDMA) system, a general packet radio service (GPRS) system, a long term evolution (LTE) system, a LTE frequency division duplex (FDD) system, a LTE time division duplex (TDD) system, a universal mobile telecommunication system (UMTS), a worldwide interoperability for microwave access (WiMAX) communication system, or a 5G system and the like.

Exemplarily, a communication system 100 applied in the embodiments of the disclosure is shown in FIG. 2. The communication system 100 may include a network device 110, and the network device 110 may be a device that communicates with a terminal device 120 (or referred to as a communication terminal or a terminal). The network device 110 may provide communication coverage for a specific geographic area and may communicate with a terminal device located in the coverage area. Optionally, the network device 110 may be a base station (base transceiver station, BTS) in the GSM system or the CDMA system, may also be a base station (NodeB, NB) in the WCDMA system, and may further be an evolved base station (evolved node B, eNB or eNodeB) in the LTE system, or a wireless controller in a cloud radio access network (CRAN). Alternatively, the network device may be a network device in a mobile switching center, a repeater station, an access point, a vehicle-mounted device, a wearable device, a hub, a switch, a bridge, a router, a network side device in a 5G network, or a public land mobile network (PLMN) that evolves in the future, and so on.

The communication system 100 also includes at least one terminal device 120 located within the coverage area of the network device 110. The "terminal device" used herein includes, but is not limited to, connection via a wired line (e.g., a public switched telephone network (PSTN), a digital subscriber line (DSL), a digital cable, or a direct cable), via another data connection/network, via a wireless interface (e.g., for a cellular network, a wireless local area network (WLAN), a digital television network such as a DVB-H network, a satellite network, or an AM-FM broadcast transmitter), via another terminal device that is configured to receive/send a communication signal, and/or via an Internet of Things (IoT) device. A terminal device that is configured to communicate through a wireless interface may be referred to as a "wireless communication terminal", a "wireless terminal", or a "mobile terminal". Examples of the mobile terminal include, but are not limited to, a satellite or cellular phone; a personal communication system (PCS) terminal that may combine a cellular radio phone with data processing, facsimileing, and data communication capabilities, may include a radio phone, a pager, Internet/Intranet access, a web browser, a notepad, a calendar, and/or a personal digital assistant (PDA) of a global positioning system (GPS) receiver, may include a conventional laptop and/or a handheld receiver, or may include other electronic devices including a radio telephone transceiver. The terminal device may refer to an access terminal, user equipment (UE), a user unit, a user station, a mobile station, a mobile platform, a remote station, a remote terminal, a mobile device, a user terminal, a terminal, a wireless communication device, a user agent, or a user device. The access terminal may be a cellular phone, a cordless phone, a session initiation protocol (SIP) phone, a wireless local loop (WLL) station, a PDA, a handheld device with wireless communication capabilities, a computing device or other processing devices connected to a wireless modem, a vehicle-mounted device, a wearable device, a terminal device in a 5G network, or a terminal device in a PLMN that may evolve in the future.

Optionally, device to device (D2D) communication may be performed between the terminal devices 120.

Optionally, the 5G system or 5G network may also be referred to as a new radio (NR) system or NR network.

One network device and two terminal devices are exemplarily depicted in FIG. 2. Optionally, the communication system 100 may include a plurality of network devices, and the coverage area of each of the network devices may include terminal devices of other numbers, which is not limited in the embodiments of the disclosure.

Optionally, the communication system 100 may also include other network entities such as a network controller, a mobility management entity, etc., which are not limited in the embodiments of the disclosure.

It should be understood that a device with a communication function in the network/system in the embodiments of the disclosure may be referred to as a communication device. Taking the communication system 100 shown in FIG. 2 as an example, the communication device may include the network device 110 having a communication function and the terminal devices 120. The network device 110 and the terminal devices 120 may be the specific devices described above, and description thereof is thus not repeated herein. The communication device may further include other devices in the communication system 100, such as other network entities including a network controller, a mobility management entity, etc., which are not limited in the embodiments of the disclosure.

An optional processing flow of the channel transmission method provided by the embodiments of the disclosure, as shown in FIG. 3, includes the following steps.

In step S201, a terminal device monitors a second channel if the terminal device detects a first channel on a time frequency resource of the first channel. The terminal device does not monitor the second channel if no first channel is detected by the terminal device on the time frequency resource of the first channel.

In the embodiments of the disclosure, the first channel is a first PDCCH, and the second channel is a second PDCCH.

The first PDCCH carries at least one of the following: DCI format 0_0, DCI format 1_0, DCI format 0_1, and DCI format 1_1. The time frequency resource of the first channel is determined through a first search space, and the time frequency resource of the second channel is determined through a second search space. The first search space and the second search space may be identical or may be different.

In some embodiments, if the terminal device detects the first channel on the time frequency resource of the first channel, the terminal device monitors the second channel in a first time window. The first time window is a DRX on duration window or a monitoring window of the second channel. The monitoring window of the second channel is determined through the second search space, and an association relationship is provided between the first time window and the time frequency resource of the first channel.

The first time window being the DRX on duration window is taken as an example herein. A first schematic diagram of the association relationship between the first time window and the time frequency resource of the first channel is provided, and as shown in FIG. 4, the time frequency resource of the first channel appears before each first time window. The terminal device determines whether to monitor the second channel in the first time window associated with the time frequency resource of the first channel through detecting the first channel on the time frequency resource of the first channel. It may also be understood as that the terminal device determines whether to enter a reception state in the first time window by detecting the first channel on the time frequency resource of the first channel. At this time, the first channel carries DCI, and a time domain resource indicated by the DCI where a physical uplink shared channel (PUSCH) is located or a time domain resource where a physical downlink shared channel (PDSCH) is located is located before the first time window. Alternatively, a schematic diagram of a relationship between a resource indicated by the DCI and the first time window is provided. As shown in FIG. 5, in the $1^{st}$ first time window and the $2^{nd}$ first time window, the terminal device detects the first channel on the time frequency resource of the first channel. The first channel carries the DCI, and the resource (e.g., the time domain resource where the PUSCH is located or the time domain resource where the PDSCH is located) indicated by the DCI is located at a start position of the first time window. Further, in the first time window, the terminal device enters the state of monitoring the second channel. In the $3^{rd}$ first time window, the terminal device does not detect the first channel on the time frequency resource of the first channel associated with the $3^{rd}$ first time window, and the terminal device does not perform channel detection in the third first time window.

A second schematic diagram of the association relationship between the first time window and the time frequency resource of the first channel is provided, and as shown in FIG. 6, the time frequency resource of the first channel is located in the associated first time window. Optionally, the time frequency resource of the first channel is located at the start position of the associated first time window.

The embodiments of the disclosure exhibit the following technical effects.

On the one hand, a new energy-saving channel or signal is not required to be introduced in the embodiments of the disclosure. Only by detecting the first channel on the time frequency resource of the first channel, the terminal device may determine whether to monitor the second channel in the first time window associated with the time frequency resource of the first channel. On the other hand, if the network device requires the terminal device to monitor the second channel in the first time window, the first channel is only required to be sent in advance on the time frequency resource of the first channel associated with the first time window, and additional information is not required to be introduced. Since the network device itself needs to schedule data transmission of the terminal device through the first channel, in the embodiments of the disclosure, the network device sends the first channel in advance merely. If the network device does not require the terminal device to monitor the second channel in the first time window, the first channel may not be sent on the time frequency resource of the first channel associated with the first time window, and additional information is not required to be introduced. The terminal device does not monitor the second channel in the first time window, and power consumption of the terminal device is thus lowered.

In some other embodiments, if the terminal device detects the first channel on the time frequency resource of the first channel, the terminal device monitors the second channel on the time frequency resource of the second channel. If no first channel is detected by the terminal device on the time frequency resource of the first channel, the terminal device does not monitor the second channel on the time frequency resource of the second channel. The time frequency resource of the first channel is determined through the first search space, and the time frequency resource of the second channel is determined through the second search space. The first search space and the second search space may be identical or may be different, and the time frequency resource of the second channel and the time frequency resource of the first channel are different.

Herein, the time frequency resource of the first channel may be one time frequency resource and may also be one time frequency resource set. Correspondingly, the time frequency resource of the second channel may be one time frequency resource and may also be one time frequency resource set. An association relationship is provided between the time frequency resource of the second channel and the time frequency resource of the first channel, and to be specific, the association relationship may be one-to-one, or one-to-many, or many-to-one. As such, the association relationship between the time frequency resource of the second channel and the time frequency resource of the first channel includes: one time frequency resource of the first channel associated with one time frequency resource of the second channel, one time frequency resource of the first channel associated with at least two time frequency resources of the second channel, or at least two time frequency resources of the first channel associated with at least two time frequency resources of the second channel. A schematic diagram of the association relationship between the time frequency resource of the first channel and the time frequency resource of the second channel is provided, and as shown in FIG. 7, each time frequency resource of the first channel is associated with two time frequency resources of the second channel. When detecting the first channel on the time frequency resource of the $1^{st}$ first channel, the terminal device monitors the second channel on the two time frequency resources of the second channel associated with the time frequency resource of the $1^{st}$ first channel. When no first channel is detected on the time frequency resource of the second first channel, the terminal device does not monitor the second channel on the two time frequency resources of the second channel associated with the time frequency resource of the second first channel.

When the time frequency resource of the first channel is one time frequency resource set, the terminal device monitors the second channel on the time frequency resource of the second channel when detecting that a ratio of the time frequency resources of the first channel to a total of the time frequency resources of the first channel is greater than a first threshold. For instance, the time frequency resources of the first channel may be a set including N time frequency resources, the first channel is detected on X time frequency resources among the N time frequency resources, and the terminal device determines whether to monitor the second channel on the time frequency resource of the second channel according to the value of X/N. For instance, when the X/N value is greater than the first threshold, the terminal device determines to monitor the second channel on the time frequency resource of the second channel associated with the X time frequency resources.

Alternatively, when the time frequency resource of the first channel is one time frequency resource set, the terminal device monitors the second channel on the time frequency resource of the second channel when detecting that a number of the time frequency resources of the first channel is greater than a second threshold. For instance, the time frequency resources of the first channel may be a set including N time frequency resources and the first channel is detected on Y time frequency resources among the N time frequency resources, and when Y is greater than the second threshold, the terminal device determines to monitor the second channel on the time frequency resource of the second channel associated with the Y time frequency resources. Optionally, when the time frequency resource of the second channel is a time frequency resource set, the terminal device determines to perform channel detection on the first time frequency resource or plural time frequency resources in the time frequency resource set of the second channel.

In the foregoing embodiments of the disclosure, the terminal device may monitor the second channel when the terminal device detects the first channel, and there is no need to wait for the second channel to be monitored in the first time window or on the time frequency resource of the second channel. Optionally, starting from the moment when the terminal device detects the first channel, monitoring of the second channel is a continuous process. That is, from the moment when the terminal device starts detecting the first channel, the terminal starts monitoring the second channel, and until the moment when the first time window arrives, the terminal device still monitors the second channel. Note that although the terminal device starts monitoring the second channel when detecting the first channel, monitoring of the second channel performed by the terminal device in the first time window or on the time domain resource of the second channel is not affected. That is, the terminal device starts monitoring the second channel when detecting the first channel, and moreover, the terminal device still monitors the second channel in the first time window or on the time domain resource of the second channel.

The embodiments of the disclosure exhibit the following technical effects. In the embodiments of the disclosure, a new energy-saving channel or signal is not required to be introduced. Only by detecting the first channel on the time frequency resource of the first channel, the terminal device may determine whether to monitor the second channel on the time frequency resource of the first channel associated with the time frequency resource of the first channel. In this way, the network device and the terminal device may dynamically adjust the behavior of the terminal device to monitor the second channel according to the data scheduling. In the case of less scheduling, the monitoring of the second channel by the terminal device may be reduced, and power consumption of the terminal device is thereby lowered.

Another optional processing flow of the channel transmission method provided by the embodiments of the disclosure, as shown in FIG. 8, includes the following steps.

In step S301, a network device determines whether to send a first channel on a time frequency resource of the first channel. The first channel is configured to perform an operation of monitoring a second channel after a terminal device detects the first channel. The first channel is configured not to perform the operation of monitoring the second channel when the terminal device does not detect the first channel.

In the embodiments of the disclosure, description related to the first channel, the second channel, and monitoring of the second channel is identical to that provided in step S201, and repeated description is thus not provided herein.

In the embodiments of the disclosure, a terminal device is further provided. A schematic diagram of a composition structure of a terminal device 400 is provided, and as shown in FIG. 9, the terminal device 400 includes the following.

A first processing unit 401 is included and is configured to monitor a second channel if a first channel is detected on a time frequency resource of the first channel. The second channel is not monitored if the first channel is not detected on the time frequency resource of the first channel.

In some embodiments, the first processing unit 401 is configured to monitor the second channel in a first time window, and an association relationship is provided between the first time window and the time frequency resource of the first channel. The first time window includes: a discontinuous reception on duration window or a monitoring window of the second channel. The monitoring window of the second channel is determined according to a second search space.

In the embodiments of the disclosure, the first processing unit 401 is configured to monitor the second channel in the first time window if the first channel is detected on the time frequency resource of the first channel. If no first channel is detected on the time frequency resource of the first channel, the second channel is not monitored in the first time window.

The first channel carries the downlink control information (DCI), and the time domain resource indicated by the DCI where the PUSCH is located or the time domain resource where the PDSCH is located is located before the first time window. Alternatively, the first channel carries the DCI, and the time domain resource indicated by the DCI where the PUSCH is located or the time domain resource where the PDSCH is located is located in the first time window. Optionally, the first channel carries the DCI, and the time domain resource indicated by the DCI where the PUSCH is located or the time domain resource scheduled by the first channel where the PDSCH is located is located in a first slot in the first time window.

In the embodiments of the disclosure, when the first channel is detected on the time frequency resource of the first channel, the first processing unit 401 is further configured to monitor the second channel.

In some other embodiments, the first processing unit 401 is configured to monitor the second channel on the time frequency resource of the second channel when detecting the first channel on the time frequency resource of the first channel, and is configured not to monitor the second channel on the time frequency resource of the second channel when no first channel is detected on the time frequency resource of the first channel. The time frequency resource of the first channel is determined according to a first search space.

In still some embodiments, the first processing unit 401 is configured to monitor the second channel on the time frequency resource of the second channel when detecting that a ratio of time frequency resources of the first channel to a total of the time frequency resources of the first channel is greater than a first threshold.

In yet some embodiments, the first processing unit 401 is configured to monitor the second channel on the time frequency resource of the second channel when detecting that a number of time frequency resources of the first channel is greater than a second threshold.

In the embodiments of the disclosure, the first search space and the second search space are identical or are different, and an association relationship is provided between the time frequency resource of the first channel and the time frequency resource of the second channel. The association relationship includes that: one time frequency resource of the first channel is associated with one time frequency resource of the second channel, one time frequency resource of the first channel is associated with at least two time frequency resources of the second channel, or at least two time frequency resources of the first channel are associated with at least two time frequency resources of the second channel.

In the embodiments of the disclosure, the first channel is the first PDCCH, and the second channel is the second PDCCH. The first PDCCH carries at least one of the following: DCI format 0_0, DCI format 1_0, DCI format 0_1, and DCI format 1_1.

In the embodiments of the disclosure, a network device is further provided. A schematic diagram of a composition structure of a network device 500 is provided, and as shown in FIG. 10, the network device 500 includes the following.

A second processing unit 501 is included and is configured to determine whether to send the first channel on the time frequency resource of the first channel.

The first channel is configured to perform the operation of monitoring the second channel after the terminal device detects the first channel.

The first channel is configured not to perform the operation of monitoring the second channel when no first channel is detected by the terminal device.

In the embodiments of the disclosure, the monitoring of the second channel includes monitoring of the second channel in the first time window, and an association relationship is provided between the first time window and the time frequency resource of the first channel. The first time window includes: a discontinuous reception on duration window or a monitoring window of the second channel. The monitoring window of the second channel is determined according to the second search space.

In the embodiments of the disclosure, the first channel carries the DCI, and the time domain resource indicated by the DCI where the PUSCH is located or the time domain resource where the PDSCH is located is located before the first time window. Alternatively, the first channel carries the DCI, and the time domain resource indicated by the DCI where the PUSCH is located or the time domain resource where the PDSCH is located is located in the first time window.

In the embodiments of the disclosure, the first channel carries the DCI, and the time domain resource indicated by the DCI where the PUSCH is located or the time domain resource scheduled by the first channel where the PDSCH is located is located in a first slot in the first time window.

In the embodiments of the disclosure, monitoring of the second channel includes monitoring of the second channel on the time frequency resource of the second channel, and the time frequency resource of the second channel is determined according to the second search space.

In the embodiments of the disclosure, the time frequency resource of the first channel is determined according to the first search space, and the first search space and the second search space are identical or are different.

In the embodiments of the disclosure, an association relationship is provided between the time frequency resource of the first channel and the time frequency resource of the second channel. The association relationship includes that: one time frequency resource of the first channel is associated with one time frequency resource of the second channel, one time frequency resource of the first channel is associated with at least two time frequency resources of the second channel, or at least two time frequency resources of the first channel are associated with at least two time frequency resources of the second channel.

In the embodiments of the disclosure, the first channel is the first physical downlink control channel (PDCCH), and the second channel is the second PDCCH. The first PDCCH carries at least one of the following: DCI format 0_0, DCI format 1_0, DCI format 0_1, and DCI format 1_1.

The embodiments of the disclosure further provide a terminal device including a processor and a memory configured for storing a computer program that can run on the processor. The processor is configured to perform the steps of the channel transmission method executed by the terminal device when running the computer program.

The embodiments of the disclosure further provide a network device including a processor and a memory configured for storing a computer program that can run on the processor. The processor is configured to perform the steps of the channel transmission method executed by the network device when running the computer program.

FIG. 11 is a schematic diagram of a hardware composition structure of an electronic device (a terminal device and a target network device) according to an embodiment of the disclosure. A terminal device 700 includes: at least one processor 701, a memory 702, and at least one network interface 704. The various components in the terminal device 700 are coupled together through a bus system 705. It may be understood that the bus system 705 is used to implement connection and communication among these components. Besides data bus, the bus system 705 also includes a power bus, a control bus, and a status signal bus. However, for the sake of clear description, the various buses are marked as the bus system 705 in FIG. 11.

It may be understood that the memory 702 may be a volatile memory or a non-volatile memory and may also include both volatile memory and non-volatile memory. The non-volatile memory may be a ready-only memory (ROM), a programmable read-only memory (PROM), an erasable programmable read-only memory (EPROM), an electrically erasable programmable read-only memory (EEPROM), a ferromagnetic random access memory (FRAM), a flash memory, a magnetic surface memory, a compact disk memory, or a compact disc read-only memory (CD-ROM). The magnetic surface memory may be a magnetic disk storage or a magnetic tape storage. The volatile memory may be a random access memory (RAM) used as an external cache. By way of exemplary but not restrictive description, many forms of RAM are available, such as static random access memory (SRAM), synchronous static random access memory (SSRAM), dynamic random access memory (DRAM), synchronous dynamic random access memory (SDRAM), double data rate synchronous dynamic random access memory (DDRSDRAM), enhanced synchronous dynamic random access memory (ESDRAM), synclink dynamic random access memory (SLDRAM), or direct rambus random access memory (DRRAM). The memory 702 described in the embodiments of the disclosure is intended to include, but is not limited to, these and any other suitable types of memory.

The memory 702 in the embodiments of the disclosure is used to store various types of data to support the operation of the terminal device 700. Examples of these data include: any computer program used to operate on the terminal device 700, such as an application program 7022. The program for implementing the method of the embodiments of the disclosure may be included in the application program 7022.

The method disclosed in the foregoing embodiments of the disclosure may be applied to the processor 701 or implemented by the processor 701. The processor 701 may be an integrated circuit chip with signal processing capabilities. In the implementation process, the steps of the foregoing method may be completed by an integrated logic circuit of hardware or an instruction in the form of software in the processor 701. The aforementioned processor 701 may be a general-purpose processor, a digital signal processor (DSP), or other components such as a programmable logic device, a discrete gate, a transistor logic device, a discrete hardware component, and the like. The processor 701 may implement or execute various methods, steps, and logical block diagrams disclosed in the embodiments of the disclosure. The general-purpose processor may be a microprocessor or any conventional processor or the like. The steps of the method disclosed in the embodiments of the disclosure may be directly implemented as being executed and completed by a hardware decoding processor, or may be executed and completed by a combination of hardware and software modules in a decoding processor. The software module may be located in a storage medium, and the storage medium is located in the memory 702. The processor 701 reads the information in the memory 702 and completes the steps of the foregoing method in combination with its hardware.

In an exemplary embodiment, the terminal device 700 may be implemented by one or a plurality of application specific integrated circuits (ASICs), DSPs, programmable logic devices (PLDs), complex programmable logic devices (CPLD), FPGAs, general-purpose processors, controllers, MCUs, MPUs, or other electronic components configured for performing the foregoing method.

The embodiments of the disclosure also provides a storage medium configured for storing a computer program.

Optionally, the storage medium may be applied to the terminal device in the embodiments of the disclosure, and the computer program causes the computer to execute the corresponding process in each method of the embodiments of the disclosure. For the sake of brevity, repeated description is not provided herein.

Optionally, the storage medium may be applied to the network device in the embodiments of the disclosure, and the computer program causes the computer to execute the corresponding process in each method of the embodiments of the disclosure. For the sake of brevity, repeated description is not provided herein.

The disclosure is described with reference to flow charts and/or block diagrams of methods, devices (systems), and computer program products according to embodiments of the disclosure. It should be understood that each process and/or block in the flow hart and/or block diagram, and the combination of processes and/or blocks in the flow hart and/or block diagram may be implemented by computer program instructions. These computer program instructions may be provided to the processor of a general-purpose computer, a special-purpose computer, an embedded processor, or other programmable data processing devices to produce a machine. In this way, the instructions executed by the processor of the computer or other programmable data processing devices generate a device for implementing the functions specified in one or more processes in the flow chart and/or one or more blocks in the block diagram.

These computer program instructions may also be stored in a computer-readable memory that may guide a computer or other programmable data processing devices to work in a specific manner. In this way, the instructions stored in the computer-readable memory generate an article of manufacturing including the instruction device. The instruction device implements the functions specified in one or more processes in the flow chart and/or one or more blocks in the block diagram.

These computer program instructions may also be loaded onto a computer or other programmable data processing devices, so that a series of operation steps may be executed on the computer or other programmable devices to generate processing of computer implementation. As such, the instructions executed on the computer or other programmable devices provide steps for implementing the functions specified in one or more processes in the flow chart and/or one or more blocks in the block diagram.

The above description is only preferred embodiments of the disclosure and is not intended to limit the disclosure. Any modifications, equivalent replacements, and modifications made without departing from the spirit and principles of the disclosure should fall within the protection scope of the disclosure.

What is claimed is:

1. A channel transmission method, comprising:
monitoring a second channel if a first channel is detected by a terminal device on a time frequency resource of the first channel, wherein the time frequency resource of the first channel is determined according to a first search space, and monitoring the second channel comprises:
monitoring the second channel on a time frequency resource of the second channel, wherein the time frequency resource of the second channel is determined according to a second search space, wherein monitoring the second channel on the time frequency resource of the second channel comprises:
monitoring the second channel in a first time window, wherein there is an association relationship between the first time window and the time frequency resource of the first channel, wherein the first time window comprises a monitoring window of the second channel, wherein the monitoring window of the second channel is determined according to the second search space; and
not monitoring the second channel if no first channel is detected by the terminal device on the time frequency resource of the first channel, wherein the first channel is a first physical downlink control channel (PDCCH) and is used for scheduling data transmission of the terminal device, and the second channel is a second PDCCH, and the first PDCCH carries at least one of the following:

downlink control information (DCI) format 0_0, DCI format 1_0, DCI format 0_1, and DCI format 1_1.

2. The method according to claim 1, wherein the first time window further comprises:

a discontinuous reception on duration window.

3. The method according to claim 1, wherein not monitoring the second channel if no first channel is detected by the terminal device on the time frequency resource of the first channel comprises:

not monitoring the second channel in a first time window by the terminal device if no first channel is detected by the terminal device on the time frequency resource of the first channel.

4. The method according to claim 1, wherein monitoring the second channel comprises:

monitoring the second channel by the terminal device when the first channel is detected by the first terminal on the time frequency resource of the first channel.

5. The method according to claim 1, wherein not monitoring the second channel if no first channel is detected by the terminal device on the time frequency resource of the first channel comprises:

not monitoring the second channel on the time frequency resource of the second channel by the terminal device if no first channel is detected by the terminal device on the time frequency resource of the first channel.

6. The method according to claim 1, wherein one time frequency resource of the first channel is associated with one time frequency resource of the second channel, or one time frequency resource of the first channel is associated with at least two time frequency resources of the second channel, or at least two time frequency resources of the first channel are associated with at least two time frequency resources of the second channel.

7. A channel transmission method, comprising:

determining whether to send a first channel on a time frequency resource of the first channel by a network device, wherein the time frequency resource of the first channel is determined according to a first search space;

wherein the first channel is configured to perform an operation of monitoring a second channel after the first channel is detected by the terminal device, wherein monitoring the second channel comprises:

monitoring the second channel on a time frequency resource of the second channel, wherein the time frequency resource of the second channel is determined according to a second search space, wherein monitoring the second channel on the time frequency resource of the second channel comprises:

monitoring the second channel in a first time window, wherein there is an association relationship between the first time window and the time frequency resource of the first channel, wherein the first time window comprises a monitoring window of the second channel, wherein the monitoring window of the second channel is determined according to the second search space;

wherein the first channel is configured not to perform the operation of monitoring the second channel when no first channel is detected by the terminal device, wherein the first channel is a first physical downlink control channel (PDCCH) and is used for scheduling data transmission of the terminal device, and the second channel is a second PDCCH, and the first PDCCH carries at least one of the following:

downlink control information (DCI) format 0_0, DCI format 1_0, DCI format 0_1, and DCI format 1_1.

8. The method according to claim 7, wherein the first time window further comprises:

a discontinuous reception on duration window.

9. The method according to claim 7, wherein one time frequency resource of the first channel is associated with one time frequency resource of the second channel, or one time frequency resource of the first channel is associated with at least two time frequency resources of the second channel, or at least two time frequency resources of the first channel are associated with at least two time frequency resources of the second channel.

10. A terminal device, comprising a processor and a memory configured for storing a computer program that can run on the processor, wherein the processor is configured to monitor a second channel if a first channel is detected on a time frequency resource of the first channel, wherein the time frequency resource of the first channel is determined according to a first search space, and the processor monitors the second channel by performing:

monitoring the second channel on a time frequency resource of the second channel, wherein the time frequency resource of the second channel is determined according to a second search space, wherein the processor monitors the second channel on the time frequency resource of the second channel by performing:

monitoring the second channel in a first time window, wherein there is an association relationship between the first time window and the time frequency resource of the first channel, wherein the first time window comprises a monitoring window of the second channel, wherein the monitoring window of the second channel is determined according to the second search space wherein the second channel is not monitored if the first channel is not detected on the time frequency resource of the first channel, wherein the first channel is a first physical downlink control channel (PDCCH) and is used for scheduling data transmission of the terminal device, and the second channel is a second PDCCH, and the first PDCCH carries at least one of the following:

downlink control information (DCI) format 0_0, DCI format 1_0, DCI format 0_1, and DCI format 1_1.

11. The terminal device according to claim 10, wherein the first time window further comprises:

a discontinuous reception on duration window.

12. The terminal device according to claim 10, wherein the processor is configured not to monitor the second channel in the first time window if no first channel is detected on the time frequency resource of the first channel.

13. The terminal device according to claim 10, wherein the processor is further configured to monitor the second channel when the processor detects the first channel on the time frequency resource of the first channel.

14. The terminal device according to claim 10, wherein the processor is configured not to monitor the second channel on the time frequency resource of the second channel when no first channel is detected on the time frequency resource of the first channel.

15. The terminal device according to claim 10, wherein one time frequency resource of the first channel is associated with one time frequency resource of the second channel, one time frequency resource of the first channel is associated with at least two time frequency resources of the second channel, or at least two time frequency resources of the first channel are associated with at least two time frequency resources of the second channel.

16. A network device, comprising a processor and a memory configured for storing a computer program that can run on the processor, wherein the processor is configured to determine whether to send a first channel on a time frequency resource of the first channel, wherein the time frequency resource of the first channel is determined according to a first search space;

wherein the first channel is configured to perform an operation of monitoring a second channel after the first channel is detected by the terminal device, wherein monitoring the second channel comprises:

monitoring the second channel on a time frequency resource of the second channel, wherein the time frequency resource of the second channel is determined according to a second search space, wherein monitoring the second channel on the time frequency resource of the second channel comprises:

monitoring the second channel in a first time window, wherein there is an association relationship between the first time window and the time frequency resource of the first channel, wherein the first time window comprises a monitoring window of the second channel, wherein the monitoring window of the second channel is determined according to the second search space;

wherein the first channel is configured not to perform the operation of monitoring the second channel when no first channel is detected by the terminal device, wherein the first channel is a first physical downlink control channel (PDCCH) and is used for scheduling data transmission of the terminal device, and the second channel is a second PDCCH, and the first PDCCH carries at least one of the following:

downlink control information (DCI) format 0_0, DCI format 1_0, DCI format 0_1, and DCI format 1_1.

17. The network device according to claim 16, wherein the first time window further comprises:

a discontinuous reception on duration window.

18. The network device according to claim 16, wherein one time frequency resource of the first channel is associated with one time frequency resource of the second channel, or one time frequency resource of the first channel is associated with at least two time frequency resources of the second channel, or at least two time frequency resources of the first channel are associated with at least two time frequency resources of the second channel.

19. The method according to claim 1, wherein the time frequency resource of the first channel is located at a start position of the first time window associated with the time frequency resource of the first channel.

20. The method according to claim 1, wherein the time frequency resource of the first channel is one time frequency resource set comprising N time frequency resources, wherein monitoring the second channel if the first channel is detected by the terminal device on the time frequency resource of the first channel comprises:

detecting, by the terminal device, the first channel on X time frequency resources among the N time frequency resources;

determining, by the terminal device, whether to monitor the second channel on the time frequency resource of the second channel according to a value of X/N; and when the value of X/N is greater than a first threshold, monitoring, by the terminal device, the second channel on the time frequency resource of the second channel associated with the X time frequency resources.

\* \* \* \* \*